United States Patent [19]

Blount

[11] 4,374,976

[45] Feb. 22, 1983

[54] PROCESS FOR THE PRODUCTION OF POLYAMIDE SILICATE RESINOUS PRODUCTS

[76] Inventor: David H. Blount, 5450 Lea St., San Diego, Calif. 92105

[21] Appl. No.: 293,874

[22] Filed: Aug. 18, 1981

Related U.S. Application Data

[60] Division of Ser. No. 130,015, Mar. 13, 1980, Pat. No. 4,291,154, which is a continuation-in-part of Ser. No. 908,106, May 22, 1978, Pat. No. 4,198,491, which is a continuation-in-part of Ser. No. 845,464, Oct. 25, 1977, Pat. No. 4,120,937.

[51] Int. Cl.³ .............................................. C08G 69/26
[52] U.S. Cl. .................................. 528/339.5; 528/26; 528/26.5; 528/28; 528/335; 528/339.3; 528/342; 528/350
[58] Field of Search ................... 528/26, 28, 335, 342, 528/350, 339.3, 339.5, 26.5

[56] References Cited

U.S. PATENT DOCUMENTS

| | | | |
|---|---|---|---|
| 4,032,511 | 6/1977 | Blount | 528/29 |
| 4,086,190 | 4/1978 | Blount | 528/25 |
| 4,089,840 | 5/1978 | Blount | 260/185 |
| 4,089,883 | 5/1978 | Blount | 536/102 |
| 4,094,825 | 7/1978 | Blount | 260/185 |
| 4,096,121 | 6/1978 | Blount | 525/385 |
| 4,104,456 | 8/1978 | Blount | 528/29 |
| 4,107,140 | 8/1978 | Blount | 528/29 |
| 4,115,635 | 9/1978 | Blount | 528/29 |
| 4,120,937 | 10/1978 | Blount | 423/335 |
| 4,125,498 | 11/1978 | Blount | 528/29 |
| 4,125,703 | 11/1978 | Blount | 528/29 |

*Primary Examiner*—Harold D. Anderson

[57] ABSTRACT

Polyamide silicate resinous products are produced by reacting halosilicon acids with a polyamine compound and a polycarboxylic acid and/or polycarboxylic anhydride. The polyamide silicate resinous products may be utilized as molding powders, as films, as sheets, as coating agents, as caulking compounds, as an adhesive and in the production of polyurethane silicate resins and foams.

10 Claims, No Drawings

PROCESS FOR THE PRODUCTION OF POLYAMIDE SILICATE RESINOUS PRODUCTS

CROSS-REFERENCE TO RELATED APPLICATIONS

This Application is a divisional of U.S. patent application Ser. No. 130,015, filed Mar. 13, 1980, now U.S. Pat. No. 4,291,154, which is a continuation-in-part of my copending U.S. patent application, Ser. No. 908,106, filed May 22, 1978, now U.S. Pat. No. 4,198,491, which is a continuation-in-part of my copending U.S. patent application, Ser. No. 845,464, filed Oct. 25, 1977, now U.S. Pat. No. 4,120,937.

BACKGROUND OF THE INVENTION

This invention relates to a process for the production of novel polyamide silicate resinous products by reacting halosilicon acids with organic polyamine and a polycarboxylic acid and/or polycarboxyl anhydride.

Halosilicon acids are produced by reacting a silicon halide with a hydrated silica compound as illustrated in U.S. Pat. No. 4,120,937. U.S. patent application Ser. No. 845,464, filed Oct. 25, 1977, now U.S. Pat. No. 4,120,937, is incorporated in this application. The exact course of the reactions which take place during the process to produce halosilicon acids is not known. When silicon tetrachloride is mixed with a dry, fine granular hydrated silica, there is a mixture of chlorosilicon produced in the form of a white powder. The mixture of chlorosilicon acids is believed to include trichlorosilicon silicate ($Cl_3Si-O-SiO-OH$); di(trichlorosilicon)silicate ($Cl_3Si-O-SiO-O-SiCl_3$); dichlorosilicon disilicate ($HO-SiO-O-SiCl-O-SiO-OH$) and poly(dichlorosilicon silicate) polymer:

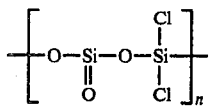

wherein n is a numeral greater than 2.

A dry, fine granular hydrated silica or hydrated silica containing Si—H groups such as silicoformic acid and polysilicoformic acid may be used in the production of halosilicon acids. The hydrated silica may be produced by any of the methods known in the arts.

Any suitable silicon halide may be used in the production of the halosilicon acids. The silicon halide preferably should contain at least 2 halogen radicals, but preferably 3 or 4 halogen radicals. Exemplificative silicon halides include, but are not limited to, the following compounds: silicon tetrachloride, silicon tetrabromide, silicon tetrafloride, silicon tetraiodide, methyltrichlorosilane, dimethyldichlorosilane, diethyldichlorosilane, di-n-butyl-dichlorosilane, diphenyldichlorosilane, phenyltrichlorosilane, ethyl phenyldichlorosilane, methyl ethyldichlorosilane, methylpropyldichlorosilane, etc.

Silicon tetrachloride is the preferred silicon halide. The silicon tetrachloride may be utilized with any of the silicon halides or mixtures thereof. It is preferable to utilize the diorganic-dihalosilanes with silicon tetrachloride in the production of halosilicon acids.

For the purpose of this invention, the products produced by the chemical reaction of hydrated silica with a silicon halide will be called halosilicon acids. For the purpose of this invention, the products produced by the reaction of the halosilicon acids, polyamine compound and a polycarboxylic acid and/or polycarboxylic anhydride will be called a polyamide silicate resinous product.

The polyamide silicate resinous products produced by the process of this invention may be utilized as molding powders, as films, as sheets, as protective coating on wood or metals, as calking compound, as an adhesive, in the production of polyurethane silicate resins and foams, in the production of epoxy silicate resins, etc. The molding powder may be molded into useful objects such as knobs, handles, gears, art objects, toys, etc., by using heat and pressure to force the melted polyamide silicate resinous product into a mold.

The primary object of the present invention is to produce novel polyamide silicate resinous products. Another object is to produce polyamide silicate resinous products that can be melted, then poured or forced, under pressure, into molds of useful objects. A further object is to produce polyamide silicate resinous products that may be further reacted with polyisocyanates to produce useful resins and foams. A still further object is to produce polyamide silicate resinous products that may be further reacted with epoxy compounds to produce epoxy silicate resins that may be used as adhesives, protective coating for wood and metals and glass reinforced sheets.

DETAILED DESCRIPTION OF THE INVENTION

In my novel process of this invention, the preferred process is to react chemically 0.5 to 1 mol of halosilicon acids, 1 to 2 mols of an organic polyamine and 1 to 2 mols of an organic polycarboxylic acid and/or a polycarboxylic acid anhydride by mixing the components, then heating the mixture to a temperature between the melting temperature of the polycarboxylic acid and/or polycarboxyic acid anhydride and the boiling temperature of the reactants at ambient pressure while agitating for 20 to 120 minutes, thereby producing a polyamide silicate resinous product which ranges from a thick liquid to a hard solid product.

In an alternate method, 0.5 to 1 mol of halosilicon acids and 1 to 2 mols of an organic polyamine are mixed, then agitated at ambient pressure and temperature for 1 to 8 hours, thereby producing a polyamine silicon acid compound; then 1 to 2 mols of an organic polycarboxylic acid is added, then heated to a temperature between the melting temperature of the polycarboxyic acid and/or polycarboxylic acid anhydride and the boiling temperature of the reactants at ambient pressure while agitating for 20 to 120 minutes, thereby producing a polyamide silicate resinous product.

In another alternate method, 0.5 to 1 mol of halosilicon acids and 1 to 2 mols of an organic polycarboxylic acid and/or polycarboxylic acid anhydride are mixed, then agitated for 1 to 8 hours at ambient temperature and pressure, thereby producing a polycarboxylic acid silicon acid; then 1 to 2 mols of an organic polyamine are added and the mixture is then heated to a temperature between the melting temperature of the polycarboxylic acid and the boiling temperature of the reactants while agitating for 20 to 160 minutes, thereby producing a polyamide silicate resinous product.

Polyamide silicate resinous product is produced by reacting the following components:

(a) halosilicon acid, 0.5 to 1 mol;
(b) organic polyamine, 1 to 2 mols;
(c) polycarboxylic acid and/or polycarboxylic acid anhydride, 1 to 2 mols.

Component (a)

The halosilicon acids are produced by reacting 0.5 to 2 mols of a hydrated silica with 1 mol of a silicon halide. The mols of the halosilicon acids are calculated on the mol of the silicon halide used to produce the mixture of halosilicon acids. The halosilicon acids are reacted by mixing a dry, fine, granular hydrated silica with 1 mol of a silicon halide having at least 2 free halogens, preferably silicon tetrachloride, then agitating the mixture at ambient temperature and pressure for 1 to 4 hours, the chemical reaction reaching completion in 6 to 12 hours. Examples and procedures are found in U.S. Pat. No. 4,120,937.

Component (b)

The polyamines to be used in this invention include those organic materials possessing a plurality of amino hydrogen, i.e., a plurality of:

groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine, diethylenetriamine, triethylenetetramine, tetraethylenepentamine, 1,4-diaminobutane, 1,3-diaminobutane, hexamethylenediamine, 3-(N-isopropylamine) propylamine, N,N'-diethyl-1,3-propanediamine, hexapropyleneheptamine, penta(1-methyl-propylene) hexamine, tri(1,2,2-trimethylethylene)tetramine, tetra(1,3-dimethylpropylene) pentamine, penta-(1,5-dimethylamylene) hexamine, penta-(1,2-dimethyl-1-isopropylethylene) hexamine and N,N'-dubutyl-1,6-hexanediamine.

Suitable aliphatic polyamines are the alkylene polyamines of the formula:

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula:

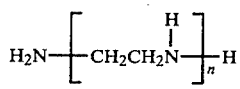

wherein n is an integer varying from about 2 to 8.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming or copolymers having groups reactive with amines such as, for example, aldehyde groups, as present on acrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as, for example:
1-cyclohexylamino-3-aminopropane,
1,4-diaminocyclohexane,
1,3-diaminocyclopentane,
di(aminocyclohexyl) methane,
di(aminocyclohexyl) sulfone,
1,3-di(aminocyclohexyl) propane,
2,4-diaminocyclohexane,
N,N'-diethyl-1,4-diaminocyclohexane, and the like.

Preferred members of this group comprise those polyamines having at least one amino or alkyl-substituted amino group attached directly to a cycloaliphatic ring containing 5 to 7 carbon atoms.

Other suitable polyamines comprise the aminoalkyl-substituted aromatic compounds such as, for example, di(aminoethyl) benzene, di(aminomethyl) benzene, tri(aminoethyl) benzene, tri(aminobutyl) naphthalene and the like.

Suitable polyamines also include the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkosilylpropylamines like triethoxysilylpropylamines.

Other suitable polyamines include the N-(aminoalkyl) piperazines, such as, for example, N-aminobutylpiperazine, N-aminoisopropyl-3-butoxypiperazine, N-aminoethylpiperazine, 2,5-dibutyl-N-aminoethylpiperazine, 2,5-dioctyl-N-aminoisobutylpiperazine and the like.

Another group of suitable materials are obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidal ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like. This reaction between polyamines and monoepoxide is effected merely by bringing the components together in proper proportion. The adducts are obtained when a mol of the polyamine is reacted with not more than one mol of monoepoxide. The excess amine can be retained or can be removed by distillation. Examples of the monoepoxidepolyamine reaction products include, among others, N(hydroxypropyl) diethylenetriamine (reaction product of propylene oxide and diethylenetriamine) and N(2-hydroxy-3-phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of the monoamines include any of those noted above for use in the compositions of the present invention. Examples of the monoamines include, among others, secondary amines such as dimethylamine, diethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Other examples include the soluble reaction products of polyepoxides and polyamines and salts thereof, such as described in U.S. Pat. No. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention include those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula:

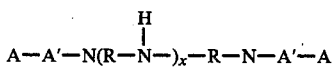

wherein x represents an integer in the range of 0 through 3 and A and A′ represent a member selected from the group consisting of hydrogen and cyanoethyl radicals, and further characterized in that the amine has at least one cyanoethyl group and at least one nontertiary amino group in the molecule. The preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula:

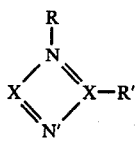

wherein X is an organic radical and preferably an alkylene radical, R′ is a long chain hydrocarbon radical, and preferably one containing at least carbon atoms, and R is an organic radical containing an amine or amine-substituted group. Particularly preferred members of this group are those obtained by reacting any of the above-described polyamines with long-chain monocarboxylic acids, such as those containing at least 12 and preferably 16 to 30 carbon atoms, such as, for example, palmitic acid, pentadeconoic acid, 4-ketomyristic acid, 8,10-dibromostearic acid, margaric acid, stearic acid, alpha-chlorostearic acid, linoleic acid, oleic acid, dehydroxystearic acid, arachidic acid, clupanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and preferably about 0.3 and 0.5 to 1. The temperature employed preferably varies from about 100° C. to 250° C.

Suitable polyamines include the aromatic polyamines, especially those having at least two—$NH_2$ groups attached to aromatic ring or rings and containing up to 25 carbon atoms.

Suitable polyamines include the sulfur- and/or phosphorus-containing polyamines such as may be obtained by reacting a mercaptan- or phosphine-containing active hydrogen with an epoxy halide to form a halohydrin, dihydrochlorinating and then reacting the resulting compound with a polyamine. N-(3-ethylthio-2-hydropropyl) diethylenetriamine may be prepared, for example, by reacting ethyl mercaptan with epichlorohydrin, dihydrochlorinating and then reacting the resulting epoxy compound with diethylenetriamine. Suitable examples of such compounds include, among others, N-(3-butylthio-2-hydroxypropyl) triethylenetetramine, N-(4-phenylthio-3-hydrobutyl) pentamethylenetetramine, N-(4-cyclohexylthio-3-hydrobutyl) ethylenediamine, N-(3-cyclohexylthio-2-hydropropyl) hexamethylenediamine, N-(3-diphenylphosphino-2-hydroxypropyl) triethylenetetramine, N-(3-dicyclohexylphosphino-2-hydroxypropyl) pentamethylenetetramine, N-(3-dididecylphosphino-2-hydroxyhexyl) diethylenetrianime, N-3-(allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloalkyl phosphinohydroxyalkyl) aliphatic and aromatic polyamines and the N-(diarylphosphinohydroxyalkyl) aliphatic and aromatic polyamines.

Suitable polyamines include the polyamines of the formula:

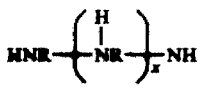

wherein x is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acid containing up to 20 carbon atoms.

Salts of polyamines and fatty acid (e.g., stearic, linoleic acid, dicanoic acid, lauric acid, oleic acids and the like) may be used in this invention.

Component (c)

Any suitable carboxylic acid and/or carboxylic acid anhydride may be used in this invention, preferably dibasic carboxylic acids. Instead of the free polycarboxylic acids, the corresponding polycarboxylic acid anhydrides or corresponding polycarboxylic acid esters of lower alcohols or their mixtures may be used for preparing the polyamide silicate. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Vegetable oils may be substituted for a portion of the polycarboxylic acid. Suitable vegetable oils include: soya bean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

The polyamide resinous products may be reacted with polyisocyanates or polyisothiocyanates to produce polyurethane silicate resinous products and foams.

Any suitable organic polyisocyanate may be used according to the invention, including aliphatic, cycloaliphatic, araliphatic, aromatic and heterocyclic polyisocyanates. Suitable polyisocyanates which may be employed in the process of the invention are exemplified by the organic diisocyanates which are compounds of the general formula:

O=C=N—R—N=C=O where R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

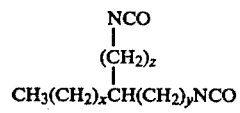

where x+y totals 6 to 22 and z is 0 to 2, e.g., isocyanastearyl isocyanate.

It is generally preferred to use commercially readily available polyisocyanates, e.g., tolylene-w,4- and -2,6-diisocyanate and any mixtures of these isomers ("TDI"), polyphenyl-polymethyleneisocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides. Phosgenation products of condensates or aniline or anilines alkylsubstituted on the nucleus, with aldehydes or ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethaneprepolymers and then also used in this invention.

Reaction products of from 50 to 99 mols of aromatic diisocyanates with from 1 to 50 mols of conventional organic compounds with a molecular weight of, generally, from about 200 to about 10,000, which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane, oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers, such as those described, e.g., in German Auslegeschriften Nos. 1,176,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4′-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XIV, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 6 and pages 198 to 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

When an aqueous solution of alkali metal silicate is being used to react with, or as a curing agent for, polyisocyanates, and in certain cases where the alkali metal silicate is reacting with polyisocyanates, it is advantageous to use activators (catalysts) such as tertiary amines, e.g., triethylamine, tributylamine, ·N-methyl morpholine, N-ethyl morpholine, tetramethylenediamine, pentamethyldiethylenetriamine, triethanolamine, triisopropanolamine, organo-metallic compound, e.g., tin acetate, tin oxtoate, tin ethyl hexoate, dibutyl tin diacetate, dibutyl tin dilaurate and mixtures thereof.

Other examples of catalysts which may used according to the invention and details of their action are described in Kunststoff-Handbuch, Volume VII, published by Vieweg and Hochtlen, Carl-Hanser-Verlag, Munich, 1966, on pages 96 and 102. Silaamines are suitable catalysts, e.g., 2,2,4-trimethyl-2-silamorpholine or 1,3-diethyl aminoethyltetramethyl disiloxane. Suitable catalysts are also tetraalkyl ammonium hydroxides, alkali phenolates, alkali metal hydroxides, alkali alcoholates and hexahydrotriamines.

Suitable flame-resistant compounds may be used in the products of this invention such as those which contain halogen, or phosphorus, e.g., tributylphosphate; tris(2,3-dichloropropyl)phosphate; polyoxypropylenechloromethylphosphonate; cresyldiphenylphosphate; tricresylphosphate; tris-(beta-chloroethyl)-phosphate;

tris-(2,3-dichloropropyl)-phosphate; triphenylphosphate; ammonium phosphate; perchlorinated diphenyl phosphate; perchlorinated terephenyl phosphate; hexabromocyclodecane; tribromophenol; dibromopropyldiene; hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium and dipotassium hydrogen phosphate; ammonium chloride; phosphoric acid; polyvinylchloride tetomers chloroparaffins as well as further phosphorus- and/or halogen-containing flame-resistant compounds as they are described in "Kunststoff-Handbuch", Volume VII, Munich, 1966, pages 110 and 111, which are incorporated herein by reference. The organic halogen-containing components are, however, preferred in the polyurethane silicate products. In the production of aldehyde-cellulose-silicate, aminoplast-cellulose-silicate, polyurethane silicate cellular products, and phosphoric acid may be used to react with the alkali metal atoms, thereby producing an alkali metal hydrogen phosphate which may be used as the flame-resistant compound.

The amount of the components used in the production of polyurethane silicate may greatly vary within the following ratios:
(a) 1 to 50 parts by weight of polyamide silicate resinous product;
(b) 50 parts by weight of an organic polyisocyanate and/or a polyisothiocyanate;
(c) 1 to 50 parts of a polyol (organic polyhydroxyl compound);
(d) 1 to 200 parts by weight of a water-binding agent;
(e) up to 10% by weight of an activator, percentage based on weight of the reactants;
(f) up to 99% by weight of a curing agent, percentage based on weight of the reactants;
(g) up to 99% by weight of a filler, percentage based on weight of the reactants;
(h) up to 20% by weight of an emulsifying agent, percentage based on weight of the reactants;
(i) up to 20% by weight of a foam stabilizer, percentage based on weight of the reactants;
(j) up to 50% by weight of a chemically-inert blowing agent, percentage based on weight of the reactants.

Any suitable polyurethane curing agent may be used in this invention. Up to 99% by weight, based on th weight of the reactants, may be used. The following are examples of curing agents and/or activators:
1. Water
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of Ml$_2$ISiO$_2$ (Ml=metal) is not critical and may vary within the usual limits, but is, preferably, between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate pentahydrate such as sodium, commercial dry granular sodium, potassium silicate and potassium metasilicate pentahydrate.
6. Water containing 20% to 70% by weight of silica sol.
7. Water containing 0.001% to 10% by weight of an activator, (catalyst) such as:
(a) tertiary amines, e.g., triethylamine; tributylamine; N-methyl-morpholine; N-ethyl-morpholine; N-cocomorpholine; N,N,N',N'-tetramethylethylenediamine; 1,4-diazobicyclo-(2,2,2)-octane; N-methyl-N'-dimethylaminoethyl piperazine; N,N-dimethylbenzylamine; bis (N,N-diethylaminoethyl)-adipate; N,N-diethylbenzylamine; pentamethyldiethylenetriamine; N,N-dimethylcyclohexylamine; N,N-dimethylcyclohexylamine; N,N,N',N'-tetramethyl-1,3-butanediamine; N,N-dimethylbeta-phenylethylamine; and 1,2-dimethylimidazole. Suitable tertiary amine activators which contain hydrogen atoms which are reactive with isocyanate groups include, e.g., triethanolamine; triisopanolamine; N,N,N',N'-dimethylethanolamine; N-methyldiethanolamine; N-ethyl-diethanolamine; and their reaction products with alkylene oxides, e.g., propylene oxide and/or ethylene oxide.
(b) Organo-metallic compounds, preferably organo-tin compounds such as tin salts of carboxylic acids, e.g., tin acetate, tin octoate, tin ethyl hexoate, tin laurate and the dialkyl tin salts of carboxylic acids, e.g., dibutyl tin diacetate, dibutyl tin dilaurate, dibutyl tin maleate or diocyl tin diacetate.
(c) Silaamines with carbon-silicon bonds as described e.g., in British Pat. No. 1,090,589, may also be used as activators, e.g., 2,2,4-trimethyl-2-silamorpholine or 1,3-diethylaminomethyl-tetramethyldisiloxane.
(d) Other examples of catalysts which may be used according to the invention and details of their action are described in Kunststoff-Handbuch, Volume VII, published by Vieweg and Hochtlen, Carl-Hanser-Verlag, Munich, 1966, on pages 96 and 102.
8. 0.001% to 10% by weight, based on the reaction mixture, of an activator (catalyst) listed above.
9. Water containing 20% to 70% by weight of a water-binding agent which is capable of absorbing water to form a solid or a gel, such as hydraulic cement, synthetic anhydrite, gypsum or burnt lime.
10. Water containing 1% to 10% by weight of bases which contain nitrogen such as tetraalkyl ammonium hydroxides.
11. Water containing 1% to 10% by weight of alkali metal hydroxides such as sodium hydroxide, alkali metal phenolates such as sodium phenolate or alkali metal alcoholates such as sodium methylate.
12. Water containing sodium polysulfide in the amount of 1% to 10% by weight.
13. Alkali metal silicate such as sodium metasilicate pentahydrate.

Surface-active additives (emulsifiers and foam stabilizers) may also be used, according to the invention. Suitable emulsifiers are, e.g., the sodium salts of ricinoleic sulphonates or of fatty acids or salts of fatty acids with amines, e.g., oleic acid diethylamine or stearic acid diethanolamine. Other surface-active additives are alkali metal or ammonium salts of sulphonic acids, e.g., dodecylbenzene sulphonic acid or dinaphthyl methane disulphonic acid; or of fatty acids, e.g., ricinoleic acid; or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of from 0% to 20% by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chlorethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used, according to the invention.

Further examples of surface-active additives, foam stabilizers, cell regulators, negative catalysts, stabilizers, flame-retarding substances, plasticizers, dyes, fillers, fungicidal and bacteriocidal substances; details about methods of using these additives, and about their action, may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retardant agents.

Particularly important and preferred are those additives which result in an even greater improvement in the fire characteristics of the product. These include not only the conventional flame-retarding agents, but also, in particular, halogenated paraffins and inorganic salts of phosphoric acid.

According to the invention, when polyurethane silicate is produced, it has been further found that it is favorable to carry out the reaction in the additional presence of a compound acting as hardening agent and lowering the pH of the reaction mixture when an alkali metal silicate is used as the curing agent. Suitable compounds of this type include, depending on the reaction mixture employed, ammonium chloride, barium chloride, barium nitrate, bleaching earths, disodium phosphate, calcium-magnesium carbonate, calcium bromide, calcium chloride, calcium iodate, potash alum, potassium fluoride, potassium borofluoride, potassium bromide, potassium carbonate, potassium metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, tetrapotassium pyrophosphate, zinc acetate, zinc carbonate and boric acid. The hardening agent may be added to Component (c) in an amount sufficient to lower the pH to 7 or 8.

Readily volatile blowing agents, e.g., dichlorodifluoromethane, trichlorofluoromethane, butane, isobutylene, vinyl chloride, etc., may be used to produce cellular solid products in this invention. In addition, the liquid reaction mixtures can be expanded into a foam by the introduction of gases, optionally under pressure, such as air, $CF_4$, noble gases and $H_2O_2$, the resulting foam being introduced into the required mold and hardened therein. The resultant foam may optionally contain foam stabilizers such as surfactants, foam formers, emulsifiers and, if desired, organic or inorganic fillers or diluents may initially be converted by blowing gas into a foam, and the resulting foam may subsequently be mixed in a mixer with the other components, the resulting mixture being allowed to harden. Instead of blowing agents, it is also possible to use inorganic or organic, finely-divided hollow bodies such as expanded hollow beads of glass, plastic, straw, expanded clay, and the like, for producing foams.

The foams obtainable in this way can be used in either their dry or their moist form, if desired, after a compacting or tempering process, optionally carried out under pressure, as insulating materials, cavity fillings, packaging materials, building materials, etc. They can also be used in the form of sandwich elements, for example, with metal-covering layers in house, vehicle and aircraft construction.

It is also possible to introduce into the foaming reaction mixtures, providing they are still free-flowing, organic and/or inorganic foamable or already foamed particles such as, for example, expanded clay, expanded glass, wood, popcorn, cork, hollow beads of plastics such as vinyl chloride polymers, polyethylene, styrene polymers or foam particles thereof or even, for example, polysulphone, polyepoxide, polyurethane, phenoplasts, aminoplasts, polyimide polymers, phenoplast silicates, aminoplast silicates, epoxy silicate polymers, polyisocyanate polymers, polyurethane silicate polymers or their reaction mixtures; the foaming mixture may be allowed to foam through interstitial spaced particles in packed volumes of these particles and, in this way, insulating materials can be produced. Combinations of expanded clay, glass or slate are especially preferred with the reaction mixture, according to the invention.

It is also possible to introduce into the foaming reaction mixtures, providing they are still free-flowing at a predetermined temperature, a blowing agent which is capable of evaporation or of gas formation at this temperature, such as, for example, a halogenated hydrocarbon. The initial liquid mixture formed can be used not only for producing uniform foams or non-uniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture, vehicle and aircraft industries.

The cellular solid products (foams) according to the invention can be added to soil in the form of crumbs, optionally in admixtures with fertilizers and plant-protection agents, in order to improve its agrarian consistency.

Since the hardened foams obtained by the process according to the invention can show considerable porosity after drying, they are suitable for use as drying agents because they can absorb water; however, they can also be charged with active substances or used as catalyst supports or as filters and absorbents.

On the other hand, the foams can be subsequently lacquered, metallized, coated, laminated, galvanized, subjected to vapor deposition, bonded or flocked in either their moist or their dry form or in impregnated form. The moldings can be further processed in their moist or their dried form, for example, by sawing, milling, drilling, planing, polishing and other machining techniques. The optionally filled moldings can be further modified in their properties by thermal after-treatment, oxidation processes, hot-pressing, sintering processes or surface melting or other consolidation processes. Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonate, etc.

Fillers in the form of particulate or powdered materials can be additionally incorporated into the liquid mixtures of the foamable reactants for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film, etc.; pieces of dolomite, chalk, alumina, asbestos, basic silicas, sand, talcum, iron oxide, aluminum oxide and oxide hydrate, zeolites, calcium silicates, basalt wool or powder, glass fibers, C-fibers, graphite, carbon black; Al-, Fe-, Cu-, Ag-powder; molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched, organic polymers including plastics and rubber waste. Of the number of suitable organic polymers, the following, which can be present, for example, in the form of powders, granulate, foam particles, beads, hollow beads, foamable or unfoamed particles, fibers, ribbons, woven fabrics, webs, etc., are mentioned purely by way of examples: polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyurea, polyethers, polyurethanes, polyimides, polyamides, polysulphones, polycarbonates and, of course, any copolymers as well. Inorganic fillers are preferred.

Generally, the composite materials according to the invention can be filled with considerable quantities of fillers without losing their valuable property spectrum. The amount of fillers can exceed the amount of the reactants. In special cases, the foamed products of the present invention act as a binder for such fillers.

Basically, the production of the cellular solid products according to the invention is carried out by mixing the reactants in one or more stages in a continuously- or intermittently-operating mixing apparatus and by then allowing the resulting mixture to foam and solidify, usually outside the mixing apparatus in molds or on suitable materials. The reaction temperature required for this, which may be from 0° C. to 200° C., and preferably from 20° C. to 160° C., may be achieved either by heating one or more of the reactants before the mixing process or by heating the mixing apparatus itself or, alternatively, by heating the reaction mixture after the components have been mixed. Combinations of these or other methods of adjusting the reaction temperature may, of course, also be employed. In most cases, sufficient heat is evolved during the reaction to enable the reaction temperature to rise to values above 50° C. after the reaction or foaming has begun.

In particular, however, the process according to the invention is suitable for in situ foaming on the building site. Any hollow forms obtained by means of shuttering in the conventional way may be filled up and used for foaming in this way.

Polyamide silicate resinous products which terminate in more than one amino radical per molecule may be utilized as an amine catalyst in the production of polyurethane product. They may be used to react with, and be used as a catalyst for, epoxy resins and epoxy silicate resins; they may be further reacted and cured to a hard resin by reacting with aldehydes, aminoplasts and phenoplasts; they may be reacted with polyisocyanates or polyisothiocyanates to produce useful resinous products and foams which may be used for thermal and sound insulation.

Polyamide silicate resinous products which are terminated in more than one carboxylic acid radical per molecule may be utilized in the production of polyisocyanate or polyisothiocyanate silicate resinous products and foams; the polyisocyanates will react with both the carboxylic acid radicals and silicate radicals; they will react with polyhydroxyl compound to produce polyesteramide-silicate resinous products which may be utilized as molding powder, as coating agents and as adhesives; they may be reacted with polyepoxy resins to produce resinous products which may be used as adhesives, as coating agents or to produce sheets, panels, tubes, etc.

The polyamide silicate resinous products may be produced in forms ranging from a thick liquid to a tough solid. The thick liquid or soft solid polyamide silicate resinous products may be reacted with polyisocyanates, polyisothiocyanates, isocyanate-terminated polyurethane prepolymers or polyisocyanate silicate prepolymers to produce polyurethane silicate resinous products and foams which may be used as adhesives, coating agents; also, the foams may be used as sound and thermal insulation, paneling, molded art objects, etc. The solid polyamide silicate resinous products are usually thermoplastic and may be used as molding powder which is heated to above its melting point, then injected into molds by pressure to produce useful products such as gears, knobs, handles, sheets, tubes, etc.

DESCRIPTION OF PREFERRED EMBODIMENTS

My invention will be illustrated in greater detail by the specific examples that follow, it being understood that those preferred embodiments are illustrative of, but not limited to, procedures which may be used in the production of polyamide silicate resinous products. Parts and percentages are by weight unless otherwise indicated.

EXAMPLE 1

About 1 mol of dry, fine granular hydrated silica and 1 mol of silicon tetrachloride are mixed at ambient temperature and pressure, then agitated for 1 to 4 hours. Hydrogen chloride is given off from the mixture. In 6 to 12 hours, the reaction is complete, thereby producing a mixture of halosilicon acids in the form of a fine, white powder. About 1 mol of hexamethylenediamine and about 1 mol of adipic acid are mixed thoroughly with the halosilicon acids, then heated to above the melting temperature of adipic acid while agitating for 20 to 120 minutes, thereby producing a solid polyamide silicate.

EXAMPLE 2

About 2 parts by weight of a dry, fine, granular hydrated silica and 3 parts by weight of silicon tetrachloride are mixed at ambient temperature and pressure, then agitated for 1 to 4 hours. Hydrogen chloride is given off from the mixture; in 6 to 12 hours, the reaction is complete, thereby producing a mixture of halosilicon acids in the form of a fine, white powder.

About 3 parts by weight of propylenediamine and 3 parts by weight of succinic anhydride are thoroughly mixed with the said halosilicon acid, then heated to above the melting temperature of succinic anhydride, but below the boiling point of propylenediamine, while agitating for 20 to 120 minutes, thereby producing a polyamide silicate resinous product.

EXAMPLE 3

About 2 mols of dry, fine granular silicoformic acid and 2 mols of silicon tetrachloride are mixed at ambient temperature and pressure, then agitated for 1 to 4 hours, thereby producing a mixture of halosilicon acids in the form of a fine, white powder.

About 2.5 mols of diethylenetriamine and 2 mols of maleic acid are mixed with the halosilicon acids, then heated to just above the melting temperature of maleic acid while agitating for 20 to 120 minutes, thereby producing a polyamide silicate resinous product.

Other polycarboxylic acids may be used in this example in place of maleic acid, such as phthalic, succinic, oxalic, malonic, glutaric, adipic, pimelic, suberic, isophthalic, fumaric, azelaic, sebacic, terephthalic, itaconic, tartaric and mixtures thereof.

EXAMPLE 4

About 2 parts by weight of silicon tetrachloride, 1 part by weight of methyltrichlorosilane and 2 parts by weight of hydrated silica are mixed at ambient temperature and pressure, then agitated for 1 to 4 hours. In 6 to 12 hours, the reaction is complete, thereby producing halosilicon acids.

About 4 parts by weight of diethylenetriamine, 2 parts by weight of phthalic anhydride, 2 parts by weight of linoleic acid and the halosilicon acids are mixed thoroughly, then heated to just above the melting point of phthalic anhydride and below the boiling point of diethylenetriamine while agitating for 20 to 120 minutes or until a thick, liquid polyamide silicate resinous product is produced.

About equal parts by weight of this polyamide resinous product and "PAPI", produced by Upjohn Chemical, are mixed thoroughly. The mixture slowly expands to 3 to 10 times its original volume to produce a rigid, tough polyurethane silicate foam.

Other polyisocyanates may be used in place of "PAPI", such as "TDI", produced by Olin Chemicals, "crude MDI", "ISONATE 143", produced by Upjohn Chemical, hexamethylene diisocyanate and mixtures thereof.

Other fatty acids may be used in place of linoleic acid such as stearic, dicanoic, lauric, oleic acids and mixtures thereof.

EXAMPLE 5

About one mol of the halosilicon acids, as produced in Example 1, and 2 mols of ethylenediamine are thoroughly mixed, the reaction taking place rapidly, thereby producing a polyaminosilicon acid compound; then about 1 mol of azelaic acid is added and thoroughly mixed and is heated to a temperature between the melting point of azelaic acid and the boiling point of the reactants while agitating for 20 to 120 minutes, thereby producing a polyamide silicate resinous product.

Water may be added to the polyamino-silicon acid compound, then the polycarboxylic acid is added. The water is evaporated while heating. The reaction may take place in an atmosphere of nitrogen in an autoclave. There is hydrochloric acid present which appears to catalize the reaction between the amino radicals and carboxylic radicals.

About equal parts by weight of the polyamide silicate resinous product produced in this example and a surcose amine polyol (POLY G 71-356, produced by Olin Chemical Co.) are mixed to produce a thick liquid; then about 2 parts by weight of this thick liquid are mixed with 1 part by weight of PAPI 27, produced by Upjohn Chemical Co., and 0.3 part by weight of methylenechloride. The mixture slowly expands to produce a tough, rigid polyurethane silicate foam which weighs about 2 pounds per cubic foot.

Other liquid polyols may be used in place of the surcose amine polyol such as polyether glycols, polyester glycols, castor oil and polythioethers, polyacetals, polycarbonates or polyesteramides containing at least 2 hydroxyl radicals, and mixtures thereof.

EXAMPLE 6

About 2 parts by weight of the halosilicon acids, as produced in Example 2, and 3 parts by weight of succinic acid are thoroughly mixed, then heated to above the melting point of succinic acid while agitating for 1 to 4 hours, thereby producing a polycarboxylic acid silicon acid compound; then 4 parts by weight of diethylenetriamine are added and thoroughly mixed. The mixture is then heated to a temperature between the melting temperature of sccinic acid and the boiling temperature of diethylenetriamine while agitating for 20 to 120 minutes, thereby producing a polyamide silicate resinous product containing free amino radical.

About equal parts of the polyamide silicate resinous product and a polyepoxy resin produced by reacting epichlorohydrin with the glycidyl ethers of a polyhydric phenol are mixed. The mixture slowly hardens to a tough, solid epoxy resin. The mixture may be applied to glass cloth to produce a tough, high-strength panel.

EXAMPLE 7

About 2 parts by weight of the halosilicon acid as produced in example 1, 2 parts by weight of hexamethylenediamine, 2 parts by weight of adipic acid and 0.5 part by weight of diethylene glycol bis(allyl carbonate) are mixed thoroughly, then heated to a temperature between the melting temperature of adipic acid and the boiling temperature of hexamethylenediamine while agitating for 20 to 120 minutes, thereby producing a polyamide silicate resinous product.

EXAMPLE 8

About 2 parts by weight of the polyamide silicate, as produced in example 6, about 2 parts by weight of polyethylene glycol (mol. wt. about 500), 0.5 part by weight of sodium metasilicate pentahydrate granules, 0.1 part by weight of triethyl amine and 0.1 part by weight of sodium docytl sulfosuccinate are mixed, then heated to about 60° C. while agitating, thereby producing a liquid emulsion. This emulsion is then mixed at 45° C. with a mixture of 3 parts by weight of PAPI 27, produced by Upjohn, and 1 part by weight of trifluorotrichloroethane. The mixture expands in a few seconds to produce a semiflexible, tough polyurethane silicate foam which weighs about 2 pounds per cubic foot, having excellent flame-retardant properties.

This foam may be utilized for sound and thermal insulation and as packaging material to protect delicate products.

EXAMPLE 9

About 2 parts by weight of the polyamide silicate resinous product, as produced in example 5, 1 part by weight of NIAX Polyol FAF 529, produced by Union Carbide, 3 parts by weight of "MDI", 3 parts by weight of Portland cement and 3 parts by weight of plaster sand are mixed thoroughly. The mixture begins to expand in about 30 seconds, expands 8 to 12 times its original volume and hardens in about 3 to 5 minutes to produce a rigid, tough polyurethane silicate foam. The rigid foam is then soaked in water for about 2 minutes. The water reacts with the excess Portland cement to produce a polyurethane silicate concrete foam.

This reacting mixture may be poured into molds of concrete blocks to produce polyurethane silicate concrete foam blocks which may be used in construction of walls, etc.

Other water-binding agents may be used in place of Portland cement such as other hydraulic cements, synthetic anhydrite, gypsum or burnt lime.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for the production of polyamide silicate resinous product modified with vegetable oil by mixing and reacting the following components:
   (a) halosilicon acids, 0.5 to 1 mol, produced by reacting 0.5 to 2 mols of hydrated silica compound with 1 mol of a silicon halide; the mols of halosilicon acid are based on the mols of silicon halide used;
   (b) organic polyamine, 1 to 2 mols;
   (c) polycarboxylic acid, polycarboxylic acid anhydride or mixtures thereof, in a total amount of 1 to 2 mols;
   (d) vegetable oil, in an amount wherein a portion of the polycarboxylic acid or polycarboxylic acid anhydride is replaced with a vegetable oil.

2. The process of claim 1 wherein the polyamine is selected from the group consisting of aliphatic, cycloaliphatic, aromatic and heterocyclic polyamines and mixtures thereof.

3. The process of claim 1 wherein the polycarboxylic acid is selected from the group consisting of aliphatic, cycloaliphatic, aromatic and heterocyclic polycarboxylic acids and mixtures thereof.

4. The process of claim 1 wherein the polycarboxylic acid anhydride is selected from the group consisting of aliphatic, cycloaliphatic, aromatic and heterocyclic polycarboxylic acid anhydrides and mixtures thereof.

5. The process of claim 1 wherein the organic polyamine is selected from the group consisting of ethylenediamine, diethylenetriamine, triethylenetriamine, triethylenetetramine, tetraethylenepentamine; 1,4-diaminobutane; hexamethylenediamine; 3-(N-isopropylamine)-propylamine; N,N'-diethyl-1,3-propanediamine, hexapropyleneheptamine; penta(1-methyl-propylene)hexamine; tri(1,2,2-trimethylethylene)tetramine; tetra(1,3-dimethylpropylene)pentamine; penta-(1,2-dimethyl-1-isopropylethylene)hexamine; N,N'-dibutyl-1,6-hexanediamine; propylenediamine, dipropylenetriamine; piperazines; tolylene diamine and mixtures thereof.

6. The process of claim 1 wherein the polycarboxylic acid is selected from the group consisting of succinic, adipic, suberic, azelaic, sebacic, phthalic, isophthalic, trimellitic, tetrahydrophthalic, maleic and fumaric acids, and mixtures thereof.

7. The process of claim 1 wherein the polycarboxylic acid anhydride is selected from the group consisting of succinic, phthalic, tetrahydrophthalic, hexahydrophthalic, glutaric acid and maleic anhydrides and mixtures thereof.

8. The process of claim 1 wherein the silicon halide is silicon tetrachloride.

9. The process of claim 1 wherein the vegetable oil is selected from the group consisting of soya bean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

10. The resinous product produced by the process of claim 1.

* * * * *